(No Model.)
J. DUNCAN & B. E. R. NEWLANDS.
MANUFACTURE AND TREATMENT OF SUGAR AND APPARATUS EMPLOYED THEREIN.
No. 278,110. Patented May 22, 1883.
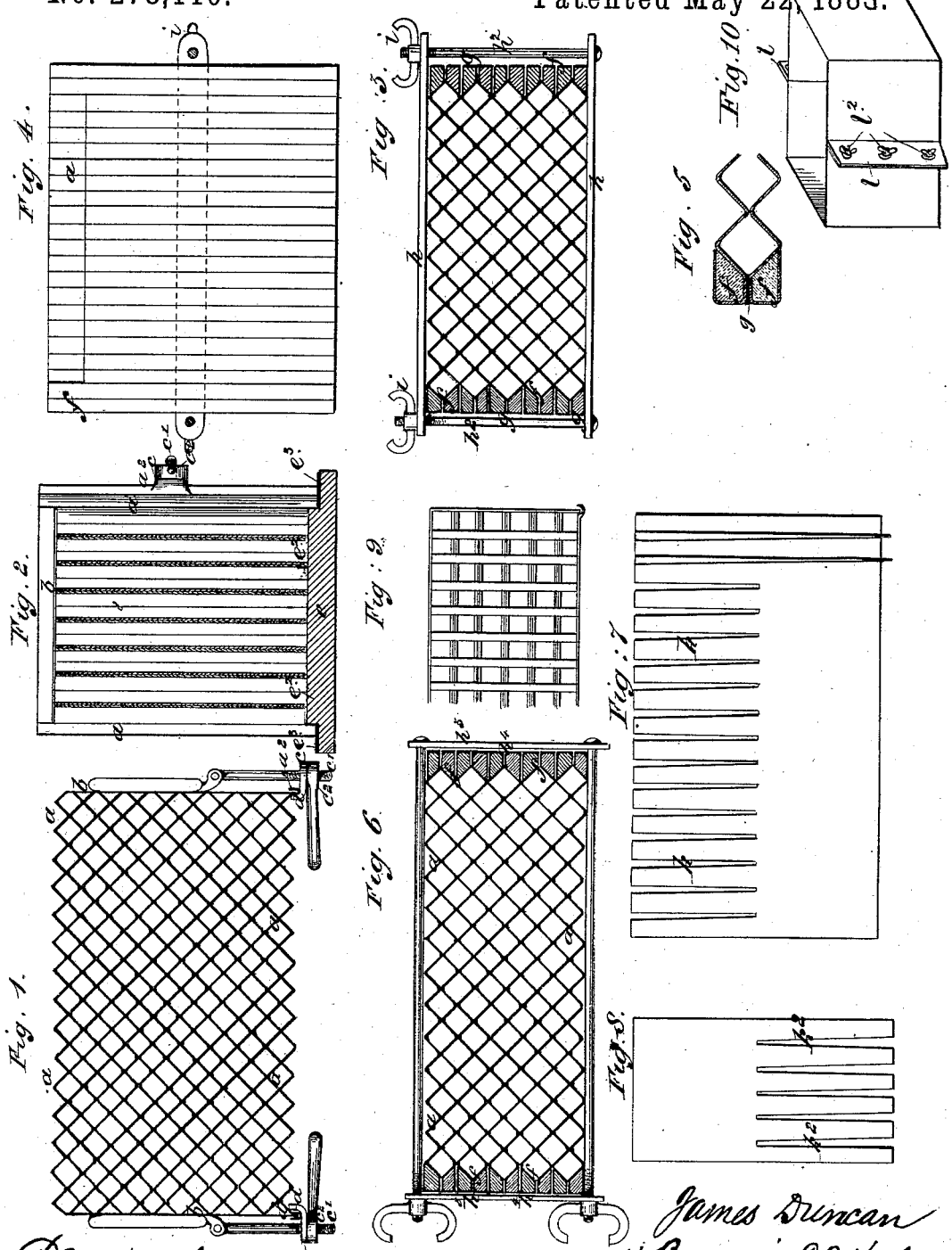

UNITED STATES PATENT OFFICE.

JAMES DUNCAN, OF LONDON, AND BENJAMIN E. R. NEWLANDS, OF CLYDE WHARF, VICTORIA DOCKS, COUNTY OF ESSEX, ENGLAND.

MANUFACTURE AND TREATMENT OF SUGAR AND APPARATUS EMPLOYED THEREIN.

SPECIFICATION forming part of Letters Patent No. 278,110, dated May 22, 1883.

Application filed January 10, 1883. (No model.) Patented in England September 10, 1881, No. 3,927, and in France March 11, 1882, No. 147,846.

*To all whom it may concern:*

Be it known that we, JAMES DUNCAN and BENJAMIN EDWARD REINA NEWLANDS, subjects of the Queen of Great Britain, and residing, respectively, at Mincing Lane, in the city of London, and Clyde Wharf, Victoria Docks, in the county of Essex, England, have invented certain Improvements in the Manufacture of Sugar and Molds Employed therein, (for which we have obtained a patent in Great Britain, No. 3,927, dated September 10, 1881,) of which the following is a specification.

Our invention, relating to improvements in the manufacture of sugar, has reference to the production of sugar in sticks more economically than heretofore.

In carrying out our invention we employ a mold the body of which is formed with two sides of a zigzag, serrated, or corrugated section, and two other sides of two flat plates. Into the body of the mold is fitted a series of serrated or corrugated plates, which form, with the corrugated ends and side plates of the mold, a series of elongated spaces of a square section, so that the sugar is produced in square sticks, which only require to be cut up transversely for use. The main body of the mold may be of a square or of other rectangular shape without a fixed bottom, and made with two serrated, corrugated, or plain end or side plates, which are one or both removable. The movable plate or plates is or are turned over at each end in such a way as to hold a strip of india-rubber or other suitable substance to form a tight joint when the plate is pressed against the ends of the sides of the molds. The movable plate or plates is or are held in position by means of lugs and screws, or in any other suitable manner. The main body of the mold may be formed of two pieces of metal, each piece forming one of the end plates and a part of the side plates of the said body, and being furnished with wings for suitable fastenings for securing the parts of the mold together. The mold is fitted with zigzag, serrated, or corrugated divisional plates, or with plates having slits extending partly through them, (after the manner of a comb,) and of a sufficient width to admit plates in the other direction which have corresponding slits. The slits are preferably made tapering, so as to facilitate the removal of the plates. By either of these means the contents of the mold are divided into square sticks. The mold is placed upon a flat surface with india-rubber or other flexible material round the edge to give a tight joint for the outside plates, and the said mold is then filled with magma, and this is allowed time to set. The mold is then removed and the sugar therein is liquored in the usual way, and this operation may be aided, if necessary, by pressure, suction, or centrifugal force. When the mass has drained sufficiently, the end plate or plates is or are removed, and the sugar in the form of sticks is dried in a stove and cut into cubes. The sugar may be dried in the mold by means of hot air before removal.

Instead of placing the molds on a flat surface before filling, a plate or raised portion of the size of the inside of the mold and about a quarter of an inch thick, mounted on a larger plate, can be used. This plate or raised portion will project into the mold, the corrugated plates terminating so as to leave space for the reception of this plate or raised portion. The part of the larger plate around the raised portion may be covered with a flexible material, upon which the lower edges of the outside plates of the mold rest to give a tight joint. The larger plate referred to may be of a size to accommodate a number of molds, if desired, having a raised portion for each mold, and it may be mounted on a trolley, if found convenient.

According to a modification, in lieu of the side and end plates hereinbefore described, we form the sides of bars of metal, fixed to the corrugated plates, between which bars are placed slips of india-rubber or other suitable material for making a joint, the whole being clamped together in a suitable manner; or a sheet of india-rubber may extend over the sides of the combined bars and be held in position by a plate of metal or other suitable material, the ends being in either case formed of the last corrugated plate.

In order that our said invention may be fully understood, we shall now proceed more particularly to describe the same, and for that purpose shall refer to the several figures on the annexed drawings, the same letters of reference indicating corresponding parts in all the figures.

Figure 1 represents in plan and Fig. 2 in transverse vertical section a mold constructed according to our invention.

The plates $a\ a$ are both formed of a zigzag, serrated, or corrugated section, and the other plates, $b\ b$, are flat. One of the sides $a$ is permanently connected with the two plates; but the other side plate $a$ is removable, and is affixed in place by means of the lugs $c$ and screws $c'$ and screw-nuts $c^2$, the ends of the said plate being turned over at each end at $a^2$, as seen clearly in the plan, forming grooves for the reception strips $d$, of india-rubber or other flexible material, the edges of the plates $b\ b$ entering into these grooves and bearing against the india-rubber to form a tight joint. The interior of the mold is filled with zigzag, serrated, or corrugated divisional plates, forming between them the spaces into which the masse-cuite, magma, or sugar to be made into sticks is poured or placed. The plates $a\ a$ form part of the outer series of spaces. The mold is open at the bottom as well as at the top, and before the masse-cuite, magma, or sugar is poured or placed in the spaces the said mold is put upon a bed-plate, $e$, with a marginal strip of india-rubber or other flexible material for the bottom edges of the outside plates to rest upon. After the sticks have been formed in the spaces and have set, the mold is removed from the bed-plate $e$, and liquoring is effected, aided, if desired, by pressure or suction; or it may be placed in a centrifugal machine, which may be constructed to carry a number of molds. A convenient form of a machine will be one of a polygonal figure in plan, each side to accommodate one mold. When the draining or depriving of moisture has been carried to a sufficient extent the plate $a$ is removed, when the dividing-plates fall apart and the sticks of sugar are dried, and may then be readily cut transversely into cubes or small pieces; or the drying may be effected by means of hot air while the sticks are in the mold.

The bed-plate $e$ may be, as before stated, provided with an additional plate or raised portion, as shown at $e^2$, which will project into the mold. The part of the plate $e$ at $e^3$ may be covered with india-rubber or other flexible material for the outside plates of the mold to rest upon, which outside plate in this case may be all flat. It will be understood that the plate $e$ may be of a size to accommodate any required number of molds, there being a raised portion, $e^2$, for each mold, and the said plate may be mounted upon wheels or on a trolley, if desired. In place of using the plates $b$, each strip may be furnished with bars $f$ at each end, as shown in plan in Fig. 3, longitudinal section in Fig. 4, and in an enlarged sectional plan of a portion of the same in Fig. 5, which bars, when the plates are placed together, will form two walls or sides of the molds. These bars may be formed by folding over the metal of the plates themselves; or they may be separate bars to which the plates are fastened. Slips of india-rubber or equivalent material are placed between the bars, as at $g$, to give a secure joint. The bars $h$ and bolts $h^2$ form a framing around the mold to connect the parts together, the bolts $h^2$ being screwed up tightly by screw-nuts $i$, running upon screws formed on the said bolts $h^2$, which screws pass through holes in the bars $h$. In place of this arrangement end plates, $h^3$, may be employed, as shown in plan in Fig. 6, which plates are preferably covered with india-rubber $h^4$, or an equivalent material, to give a secure joint between the bars $f$. In this case the material $g$ between the bars may be dispensed with; or it may still be retained. The outer sides or body parts of the mold are preferably continued up, as shown in Figs. 2 and 4, to a higher level than the corrugated plates, to form a trough-like upper part for the reception of the masse-cuite, magma, or sugar to be molded. The plates $a$ may be straight instead of being corrugated.

The main body of the mold, in place of being formed of separate plates, may be made of two pieces of metal, each forming an end and part of each of the sides of the body of the mold, and being furnished with wings for the fastenings, which may be of any suitable kind. Fig. 10 is a perspective view of such a body part. The joining up when the corrugated plates are inserted in the mold is effected by passing bolts or fastenings through the wings $l$, as shown at $l^2$. The advantage of this form of body is that it is composed of only two parts and is easily made and cleaned. It is filled with the zigzag or with the comb-like division-plates, or with plates of other suitable form.

By loosening the fastenings the corrugated plates and sticks can be readily removed, and on the plates again being put in place and the fastenings again secured the said plates are firmly held in position. In place of the corrugated plates described, the molds may be provided with the comb-like plates, formed as represented in Figs. 7, 8, and 9, Figs. 7 and 8 being, respectively, side elevations of one of the plates to be placed longitudinally of the mold and of one of the plates to be placed transversely of the mold. Fig. 9 is a plan of a portion of the mold, showing portions of the plates fitted together. The plates to be placed in one direction have slots $k$ in their upper parts, their lower parts being continuous, and the other plates to be placed transversely to these have slots $k^2$ at their lower parts, extending through a distance about equal to the continuous parts of the other plates, and with unslotted upper parts equal in extent to the slots in the said other plates, so that these plates can be placed together by slipping the slots of the plates over the unslotted parts of the plates transverse to them, as shown in Fig. 9, and with regard to two plates in Fig. 7. The slots of the plates are preferably wedgeshaped, the parts which are fitted into them being correspondingly formed, to facilitate the removal of the plates.

Although we have shown but one plate in the arrangement Figs. 1 and 2 as being removable, yet more than one may be so removable, if desired.

The surfaces of the mold which come in contact with the sugar are formed of or covered with a metal or material which will not injuriously affect the said sugar.

It may be observed that heretofore sugar-molds with division-plates of zigzag or equivalent form have been made; also, a device having two series of comb-like cutters arranged transversely for dividing a mass of sugar. These old apparatus are of course not included in this invention.

We claim—

1. In a sugar-mold, a side or end plate of zigzag, corrugated, or equivalent form, the same projecting above the inner division-plates and forming the outer wall of the outer row of molding-spaces, substantially as described.

2. In a sugar-mold, side or end plates of a zigzag, corrugated, or equivalent form, connected at the corners so as to form a hollow frame to contain the inner division-plates, said zigzag or equivalent side or end plates constituting walls of outer rows of molding-spaces, substantially as described.

3. A sugar-mold comprising two series of slotted or comb-like plates arranged transversely in a frame, and adapted to allow the sugar to be cast or placed in the molding-spaces between said plates, substantially as described.

4. The combination, with a frame composed of side plates and end plates, and the division-plates in said frame, of the means for detachably connecting the side and end plates, the said means comprising screw-nuts, lugs, and packing, substantially as described.

5. A sugar-mold open at both ends, and comprising division-plates and end plates formed of upright bars fixed to a former by the division-plates, substantially as described.

6. The bottom or bed plate having a depression around the middle portion, in combination with the body of the mold having at the ends and sides below the division-plates extensions which surround said raised middle portions, substantially as described.

7. The outer part of the mold for containing the division-plates, the same being formed of two parts bolted together, each part forming one side or end, and a part of the two adjacent sides or ends, substantially as described.

8. A sugar-mold comprising a number of plates permanently connected, a side or end plate detachably connected with them, and inner division-plates contained within the frame formed by said plates, substantially as described.

In testimony whereof we have signed our names to this specification in the presence of two subscribing witnesses.

JAMES DUNCAN.
B. E. R. NEWLANDS.

Witnesses:
WM. JOHN WEEKS,
RUDOLPH CHAS. NICKOL,
  Both of 31 Lombard Street, London.